United States Patent [19]

McGee

[11] Patent Number: 4,621,615
[45] Date of Patent: Nov. 11, 1986

[54] ENERGY CONTROL DEVICE

[76] Inventor: Thomas D. McGee, 2924 Woodland, Ames, Iowa 50010

[21] Appl. No.: 766,798

[22] Filed: Aug. 19, 1985

[51] Int. Cl.$^4$ .................................................. F24J 2/40
[52] U.S. Cl. .................................... 126/419; 126/422; 126/DIG. 1; 374/29; 374/30; 49/25
[58] Field of Search ................ 126/419, DIG. 1, 422; 374/29, 30; 136/206; 160/1, 7; 49/25

[56] References Cited

U.S. PATENT DOCUMENTS 4,401,104  8/1983  Kuzorau ............................. 126/419
4,555,764  11/1985  Kuehn ............................. 126/419 X

FOREIGN PATENT DOCUMENTS 19556  2/1982  Japan ................................. 126/419

Primary Examiner—Randall L. Green

[57] ABSTRACT

A heat transfer sensing apparatus for opening window drapes and blinds determines whether the net heat flux is positive or negative. The apparatus includes first and second temperature sensing devices which are mounted adjacent a window. Both of the devices are exposed to the convective heat transfer conditions within the room, and the first temperature sensing device can be heated or cooled by radiant energy through the window. A shield shields the second temperature sensing device from direct radiant heat transfer to the window. A signal generator device connected to the temperature sensing devices generates a signal depending upon the difference in temperature of the temperature sensing devices, and the drapes are opened or closed according.

9 Claims, 6 Drawing Figures

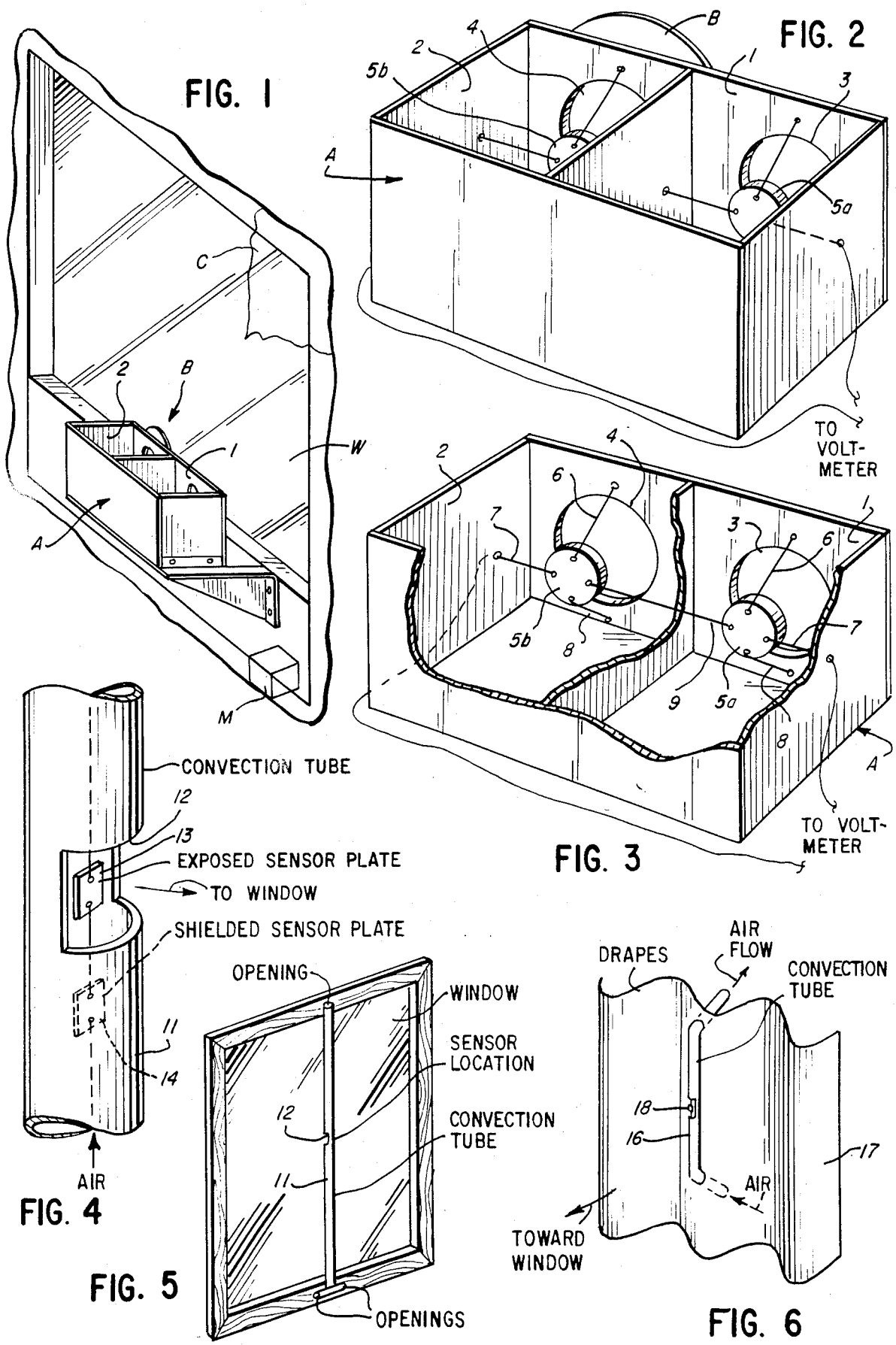

ENERGY CONTROL DEVICE

BACKGROUND AND SUMMARY OF THE INVENTION

Many heat transfer situations combine conduction, convection and radiation mechanisms. One such situation commonly encountered is that of an uncovered window through which the sun's radiant energy enters. There is a heat flux inward which depends on the intensity of the sunlight and the angle of the sun. Reflection increases as the sun direction angle increases away from that normal to the surface of the glass. The intensity changes with the weather. Therefore, there is no way of predicting the heat flux in through the window by radiant heat transfer.

When the weather is cold outside, heat will be lost through a window by radiation and convection also. The convection loss is complex. It involves heat transfer by convection on the inside surface, heat transfer by conduction through the glass, and heat transfer by convection on the outside surface.

When it is warmer outside than inside the window, as in the summer, heat will usually be transferred inwards by all the heat transfer mechanisms. It would be possible to close the window with a thermal barrier such as insulating blinds, covers, or shutters to control the heat transfer, and thus control the energy supply to and from the building. Therefore, there is a need for a device to control automatically the heat flux and thus to conserve energy.

The invention disclosed here makes it possible to regulate heat transfer and is especially useful for windows of buildings or other solar systems. Because heat flow cannot be measured directly, because of the complexity of the heat transfer processes, and because it is the result of these transfer processes which is important, what is needed is a device that will determine whether the net heat flux is positive or negative (where positive is defined as heat flow from outside to inside). This should be done in such a way that the decision as to whether to open or close the thermal barrier is made for the real situation existing on the inside and outside, with respect to the heat transfer conditions occurring. I have invented a device to make such a measurement, and which can be used to then control the heat transfer blinds, automatically, if desired.

DESCRIPTION OF THE DRAWING

The invention will be explained in conjunction with illustrative embodiments shown in the accompany drawing, in which FIG. 1 is a perspective view of an energy control device in accordance with the invention mounted adjacent a window;

FIG. 2 is an enlarged perspective view of the energy control device;

FIG. 3 shows some of the details of the energy control device;

FIG. 4 is an enlarged fragmentary perspective view of a sensor assembly mounted in a tube;

FIG. 5 is a perspective view of the sensor assembly of FIG. 4 mounted adjacent a window; and FIG. 6 is a fragmentary perspective view of another sensor assembly mounted in a window drape.

DESCRIPTION OF SPECIFIC EMBODIMENTS

The invention can be explained by reference to FIG. 1. In its simplest form it consists of a detector A and reflector B. The latter is a barrier for radiant energy transport through the window W to or from one of the compartments in the detector A. The reflector can be any barrier attached to the window. It is opaque to radiant heat transfer in the visible, ultraviolet, and near infrared region of the spectrum. A sheet of aluminum foil would do. The detector A is divided into two parts 1 and 2. Radiant heat can enter compartment 1 without interference from the barrier. Radiant heat is prevented from reaching the compartment 2 by the barrier B. Then, if the net radiant heat transfer is positive the first compartment will be hotter than the second and a temperature sensing device can be used to control the thermal barrier c, which can be drapes, blinds, or the like.

The construction of the detector A is very important and may be understood by reference to FIG. 2. The detector has two compartments 1 and 2 and is a hollow box without top or bottom, constructed of wood or plastic or similar low thermal conductivity material. The open top and bottom allow air to circulate vertically so that convective heat transfer conditions are essentially the same in each side of the detector. The side toward the window has two holes 3 and 4 cut through it so that radiant energy and air can circulate through them, but one side is shadowed by the barrier B on the window—so that radiant energy cannot be delivered directly to it from outside.

Inside each compartment is an identical receiver plate 5a and 5b as shown in FIG. 3. Each plate serves as a temperature sensor. The side facing the window is painted black or grey to have a high radiant emittance value. (The absorption of the plates can be adjusted by varying the density of the grey surface.) For one such configuration, the sensor plates are copper discs and are supported by three copper wires 6, 7, and 8 and one constantan wire 9. The constantan wire 9 is connected to both copper discs. Two of the copper wires 6 and 8 of each disc are insulated where they are fastened to the box. The other wires 7 are also insulated where they pass through the box, but they are carried out to a digital voltmeter. Then the temperature difference between the two discs creates a thermoelectric EMF (for two opposing type T thermocouples) which is proportional to the temperature difference between the two discs. When the thermal flux is positive the uncovered disc will generate a positive EMF. When the thermal flux is negative the uncovered disc will create a negative EMF. The polarity, and magnitude if desired, of this signal is then used to control the position of the blinds. Of course, when the blinds are closed they must not cover the window just in front of the receptor A.

Note that whether the signal is used to open the blinds can be based upon other sensors inside and outside the window, so that heat will be admitted when the weather is cold outside, but excluded when it is hot.

The geometry of the differential sensor assembly can be modified in many ways. It is only essential that one sensor be shielded from radiant energy through the window, that the other sensor be exposed to it, and that both sensors be exposed to the heat transfer conditions within the room. The solid angle of radiant energy from the sun as it moves from horizon to its zenith to horizon must be considered in arranging the positions of the sensors relative to the entrance pupil, and the position of the radiant energy shield (barrier B in FIGS. 1 and 2). This usually means the sensors 5 should be close to the entrance pupil, that the shield be large and that its shadow never falls on the other sensor. The exact requirements depend upon the latitude of the installation. Solar energy books give the sun track in relationship to latitude and time of year.

Heat conduction through the glass of a window often increases, or decreases, the temperature of the interior surface relative to that of the room (the room temperature is that of an opaque object exposed to the weighted average radiant and convective heat transfer from the surroundings near, but not exposed to, the heat transfer from the window). A film of air next to the window is heated or cooled so that a convection current associated with the window, itself, rises or descends. It is essential that the sensors not be immersed in that air stream, but rather be immersed in the normal convection currents associated with the room. This usually means either the sensors be an inch or more away from the inner surface of the window pane or that the room convection currents be channeled equally to both sensors.

The sensor must work when the drapes are either open or closed. In the open position both sensors could receive the incoming radiant energy if it were not for the presence of the shield B in FIG. 2. Then the differential signal of sensor 1 versus sensor 2 gives a positive or negative signal to actuate the motor m moving the drapes. If the drapes are closed radiant energy through the window would be intercepted if they covered the sensors. Therefore, it is essential that the drapes not cover the sensors in the closed position. This can be achieved by either providing a separate small window for the sensors, by providing a drape that covers most of the window, but not the area of solid angle for the sensors, by providing sensors mounted in a convection tube attached to the window frame to channel room air to them, by providing a sensor mounted in the drapes to provide a continuous convection channel for room air regardless of the position of the drapes, or by other suitable methods not mentioned here. It is understood that all other possible geometries for providing the required heat transfer conditions are included within the scope of this invention.

The sensor devices used in this invention can be any temperature detecting device suitable for providing a differential output signal. In FIG. 3 the sensors 5a and 5b are shown as two copper-constantan (type T) thermocouples mounted with their Seebeck voltages in opposition. Then if sensor 5a is hotter than sensor 5b, radiant energy is entering through the window. These sensors could be replaced by any other sensitive temperature detector, such as thermistors, thermopiles, diodes, resistance temperature detectors, infrared detectors, bolometers, etc. It is understood that all such temperature detectors are included within the scope of this invention.

The time constant for the temperature detectors depends, to a first approximation, on the convective heat transfer conditions of the sensors, their thermal mass, and the area and emittance of the sensor surfaces exposed to radiation through the window. It is often desired that the time constant be about a minute or two, so that the sensor will not be actuated every time someone walks in front of the window, or a cloud briefly obscures the sun. (The time constant for cooling, for example, is the negative reciprocal of the slope of a plot of the natural logarithm of the temperature as a function of time.) Choosing the thermal mass of the sensors, controlling the convection heat transfer rate (for example, by providing forced convection to the sensors) or adjusting the radiant surface area or emittance characteristics are suitable methods for controlling the time constant to make it suitable for a particular application. All such methods are understood to be included in the scope of this patent.

Even with sensitive detectors the radiant heat transfer produces a very small signal for most windows. If thermal energy is entering this will be a positive signal when the sensors are arranged as in FIGS. 1, 2 and 3. If thermal energy is leaving the signal will be negative. The sign of the signal is used to control the drapes. Amplification and impedance matching are usually needed to provide a strong enough signal and suitable electric power to actuate the motor moving the drapes. It is understood that all such interfacing methods, including computer interfacing, are included within the scope of this invention. It is also understood that a certain magnitude of sensor signal can be required to change the position of the drapes (there can be a "deadband" in which the drapes are not actuated). This also is included in the scope of this invention.

The materials of construction for supporting the sensors and providing room convection paths must be of sufficiently low thermal conductivity so that their conduction does not appreciably alter the performance of the device. Usually this requires a wood or plastic housing, and that very thin metal wires be used in constructing the device. Often it is convenient to use an electric motor to open or close the drapes. However, it is understood that mechanical, electrical, pneumatic and all other methods of opening or closing drapes are included within the scope of this invention.

The principles involved in this invention will be explained with four examples:

EXAMPLE 1

A detector was arranged as shown in FIGS. 1 and 2 in which each sensor 5 was a penny-shaped copper disc, painted black on the side facing the window. The wires shown in FIG. 3 were ten mil copper or constantan wires. The walls of the sensor assembly and supports were made of paper board. The entrance pupils 3 and 4 were $\frac{3}{4}''$ in diameter at a distance of four inches from the window and were spaced eight inches apart. The disc B was 12" diameter. When exposed on June 15, 1981 with an ambient temperature of 75° F. in the room, a signal of 50 to 350 microvolts was generated when sunlight entered. A negligible signal was generated when the sun was blocked off by shadowing the receptor. The intensity of the sunlight determined the magnitude of the signal. Using an instrumentation amplifier with a gain of ten provided a sufficient signal to actuate drapes. Only at night was there a negative signal to open the drapes. The time constant for this instrument was 3.9 minutes.

EXAMPLE 2

A temperature sensor was constructed arranged as in FIGS. 1 and 2. The 10 mm square sensors were constructed of one mil platinum foil and the wires were type S thermocouple wires. Two thermocouples were wired in opposition as in example 1. (One leg was pure platinum and the other was platinum 10% rhodium for each thermocouple.) The output of the sensor was amplified one hundred times with an instrument amplifier and the amplified output was connected to a digital voltmeter that was equipped with a computer interface bus (IEEE 488). An interface was constructed with TTL microprocessor components to allow the computer to address the digital voltmeter, sense drape position, and operate the drapes. A program was written to interogate the digital voltmeter at one minute intervals. During winter operation, if the signal was positive (energy coming in), the drapes were opened, or allowed to remain open. If the signal was negative, the drapes were closed or allowed to remain closed. However if the amplified signal was within ±10 mV of zero, the drapes were allowed in an unchanged position, open if already open, or closed if already closed. Provision was made in the program to accommodate summer instead of winter requirements, that is, to close the drapes with a positive signal and open the drapes with a negative signal. A magnetic tape record was made of the signal sign and magnitude, the drape status, the time and date and the action taken in response to the signal.

The system worked as designed as long as the sensors were properly exposed and shaded as shown in FIGS. 1 and 2. The time constant for the sensor was 1.38 minutes. It was difficult to arrange the sensor so that the drapes, in the closed position, did not shade both sensors when the drapes covered almost the entire window in the closed position. It was necessary to cut away part of the drape or to re-adjust the sensor position to accommodate the changes in sun angle occurring during the day.

EXAMPLE 3

The computer system and instrumentation described in Example 2 was used in conjunction with a sensor assembly mounted as shown in FIGS. 4 and 5. A convection tube 11 of 1" diameter polyvinylchloride pipe was mounted to extend vertically from the top to the bottom of the window, an opening 12 (FIG. 4) was provided in the tube, and a pair of sensors 13 and 14 were mounted within the tube. The convection tube was mounted between the drapes and the window so that the sensor 13 adjacent the opening 12 was exposed at all times. The convection tube conducted air by natural convection from the ceiling to the floor. The flow of air subjected both the shielded sensor 14 and the exposed sensor 13 to the convection conditions within the room. This arrangement eliminated the problem of the drapes convering the sensors. It was operated in February 1984 when the weather was always cold. The drapes automatically closed during the night and also during the day if heat was lost from the window.

EXAMPLE 4

The computer system and the instrumentation described in Example 2 was used in conjunction with a convection tube 16 mounted in drapes 17 as shown in FIG. 6. An opening 18 was provided in the tube and an exposed sensor was mounted in the tube adjacent the window and a shielded sensor was mounted in the tube away from the window.

In mounting the convection tube in the drapes, the convection tube must operate when the drapes are open or closed so they must be mounted in a position that will be always exposed to the sun when in either the open or closed condition. The entrance and exit of the convection tube must always be exposed to room air.

It is apparent that, in the examples above, forced convection could also be used. It is only necessary to adjust the velocity of the air to a low value representative of the convection currents normally present in the room, and both natural and forced convection are understood to be included in the scope of this invention. Other geometrical arrangements could be used for the sensor. It is only necessary that one element be exposed to radiation, one be shielded, and both exposed to the natural heat transfer conditions within the room, excepting the radiant energy through the window. All such arrangements are understood to be included within the scope of this invention.

It is also apparent that many windows could be controlled by a single sensor, or by the average signal from several sensors. These arrangements are also included within the scope of this patent.

The sensor assembly and controls can be used in a much simpler form than described in the examples above. The entire electrical circuitry can be combined into a single small package by using available solid state components. These could include a D.C. operational amplifier to amplify the signal and a microprocessor to sense signal sign, compare it with the desired sign (positive in winter, negative in summer) and actuate a relay to open or close the drapes if necessary.

Many other temperature sensing devices could be used. It is within the scope of this invention that other temperature sensors or other methods of suspending the sensor could be used. Likewise other methods of converting the sensor signal to control the input through the window, and ways of preventing sunlight from entering not discussed here, are within the scope of this invention. Many other details may be varied by those skilled in the art without departing from the spirit and scope of the invention.

I claim:

1. A heat transfer sensing apparatus for operating a movable thermal barrier for covering and uncovering a window in a room comprising:
   (a) first and second means for sensing temperature;
   (b) mounting means for mounting the first and second temperature sensing means adjacent a window so that both temperature sensing means are exposed to the convective heat transfer conditions within the room and the first temperature sensing means can be heated or cooled by radiant energy through the window;
   (c) means for shielding the second temperature sensing means from direct radiant heat transfer through the window;
   (d) signal generating means connected to the first and second temperature sensing means for generating a signal depending on the difference in temperature of the temperature sensing means; and
   (e) means for moving the thermal barrier based on said signal and on whether or not it is desired that radiant heat enter, or leave, the room.

2. The apparatus of claim 1 in which the mounting means includes separate compartments for the first and second temperature sensing means, each of the compartment having a front surface adapted to face the window and openings for permitting convection currents in the room in which the apparatus is mounted to pass both of the temperature sensing means, the compartment for the first temperature sensing means having an opening for permitting radiant energy from the sun to contact the first temperature sensing means.

3. The apparatus of claim 2 in which the front of the compartment for the second temperature sensing means has an opening aligned with the second temperature sensing means and the shielding means is mounted outside of the compartment and is aligned with the front opening.

4. The apparatus of claim 3 in which the front of the compartment for the first temperature sensing means has an opening aligned with the first temperature sensing means whereby radiant energy from the sun can heat the first temperature sensing means.

5. The apparatus of claim 1 in which the mounting means is a tube adapted to be mounted between the thermal barrier and the window, the first and second temperature sensing means being mounted in the tube and the tube having an opening exposing the first temperature sensing means, the tube also having openings for permitting convection currents in the room in which the apparatus is mounted to pass both of the temperature sensings means, the shield means for the second temperature sensing means being provided by the tube.

6. The apparatus of claim 1 in which the signal generating means is a constantan wire.

7. The apparatus of claim 1 in which the first and second temperature sensing means are thermocouples.

8. The apparatus of claim 1 in which the first and second temperature sensing means are exposed to the convective heat transfer conditions within the room both when the thermal barrier covers the window and when the thermal barrier uncovers the window.

9. The apparatus of claim 8 in which the first temperature sensing means can be heated or cooled by radiant energy through the window both when the thermal barrier covers the window and when the thermal barrier uncovers the window.

* * * * *